United States Patent
de Groote et al.

(10) Patent No.: US 7,367,519 B2
(45) Date of Patent: May 6, 2008

(54) PROCESSING TOOL FOR FOODSTUFFS

(75) Inventors: Jan-Hendrik de Groote, Haaltert (BE); Jean-Marie DeCraim, Buggenhout (BE)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 11/432,765

(22) Filed: May 12, 2006

(65) Prior Publication Data

US 2007/0262182 A1    Nov. 15, 2007

(51) Int. Cl.
*A47J 42/04* (2006.01)
(52) U.S. Cl. .................................... 241/169.1; 241/168
(58) Field of Classification Search ............. 241/169.1, 241/169.2, 273.2, 162, 164
See application file for complete search history.

(56) References Cited

U.S. PATENT DOCUMENTS

| | | | |
|---|---|---|---|
| 795,746 A | 7/1905 | Wingfield et al. | |
| 3,581,790 A * | 6/1971 | Conte | 241/88.1 |
| 3,589,421 A | 6/1971 | Locker | |
| 3,698,460 A | 10/1972 | Ashton et al. | |
| 4,082,230 A | 4/1978 | Bounds | |
| 4,212,430 A | 7/1980 | Dale et al. | |
| 4,311,283 A | 1/1982 | Bounds | |
| 4,348,950 A | 9/1982 | Harris | |
| 4,714,205 A | 12/1987 | Steinko | |
| 5,513,562 A | 5/1996 | Moor | |
| 5,618,004 A | 4/1997 | Klearman et al. | |
| 6,164,574 A | 12/2000 | Weibel | |
| 6,237,474 B1 | 5/2001 | Short et al. | |
| 6,637,684 B1 | 10/2003 | Ross et al. | |
| 6,834,817 B2 | 12/2004 | Manson | |
| 6,945,486 B2 | 9/2005 | Teng | |
| 2004/0103797 A1 | 6/2004 | Repac et al. | |

* cited by examiner

*Primary Examiner*—Faye Francis

(57) ABSTRACT

A processing tool for garlic and like edibles including a container mounted comminuting unit having-upper-and lower sets of spaced linearly aligned blades selectively presented in an upwardly directed operating position upon an inverting of the unit, the blades of each set having a comminuting profile differing from that of the blades of the other set and are selectively engaged by a set of spaced pusher teeth aligned along a sinusoidal path and mounted on an overlying cap for, upon rotation of the cap relative to the comminuting unit, moving an edible through the comminuting blades for the desired comminution thereof, the cap including a separate chamber for preparation of the edible before the comminuting process.

20 Claims, 8 Drawing Sheets

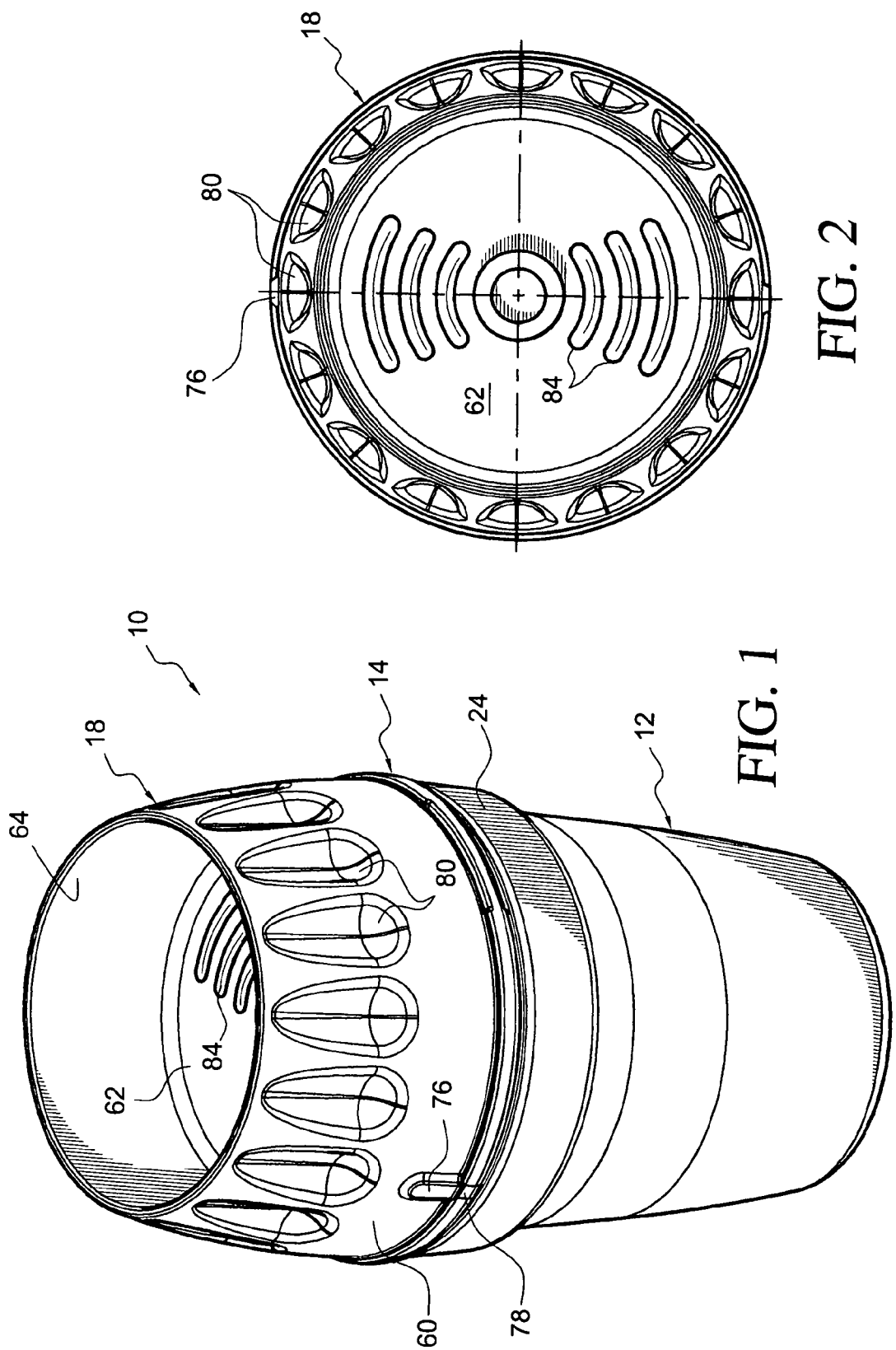

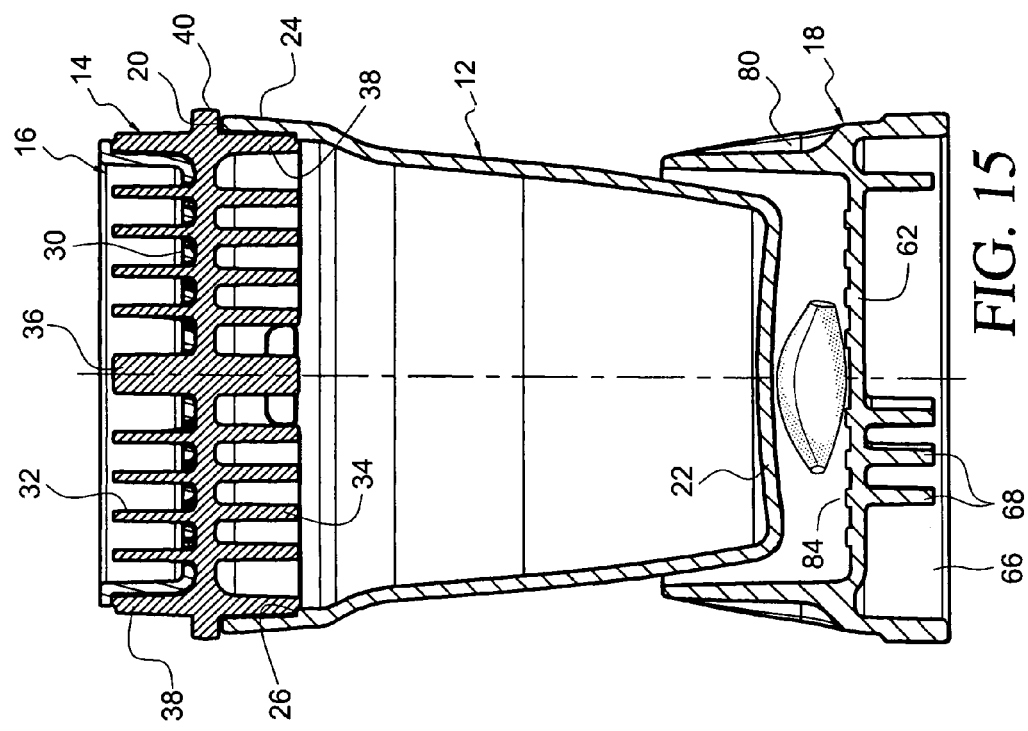
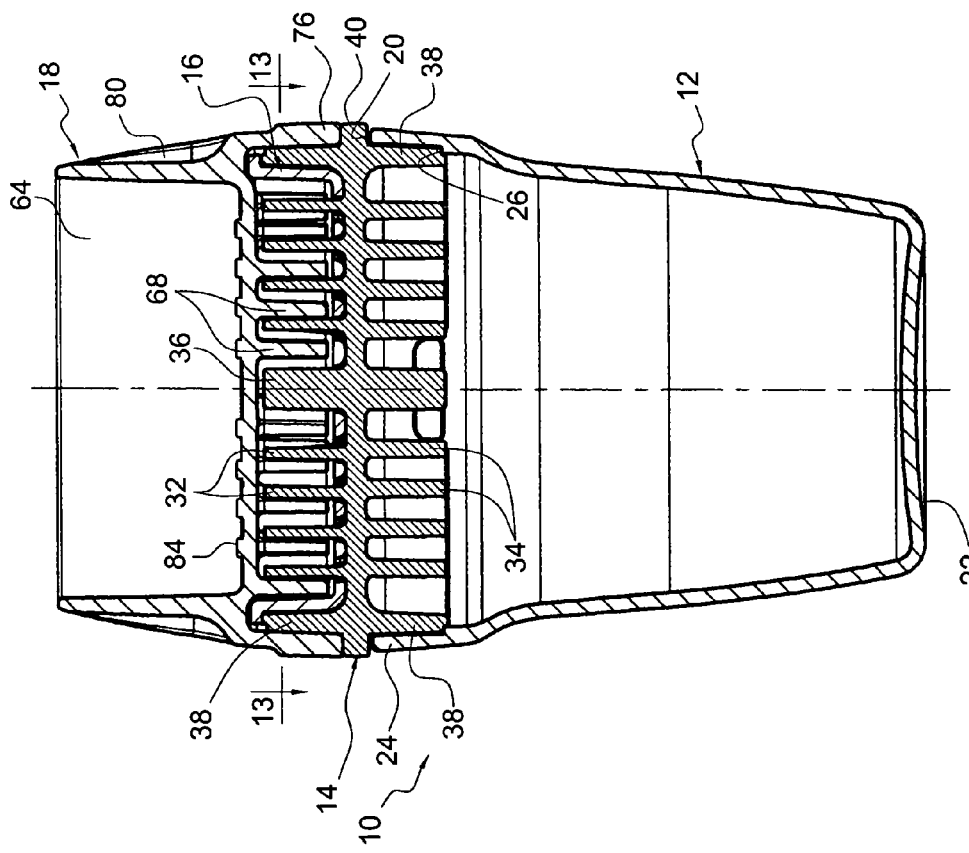

PROCESSING TOOL FOR FOODSTUFFS

BACKGROUND OF THE INVENTION

Hand-held kitchen tools for the comminuting of foodstuffs and the like are well known in the art. While not limited thereto, the present invention is particularly concerned with the processing of garlic for use as a component in food preparation. This will include the basic steps of decorticating or removing the outer skin or shell to expose the garlic cloves, and the slicing, pulverizing or otherwise comminuting of the cloves.

Earlier forms of garlic tools have generally employed squeeze-type implements wherein, through the manipulation of a pair of hinged arms, a plunger engages within a chamber with a perforated bottom to progressively crush a chamber-received clove with the particle and liquid effluent discharging through the perforated bottom of the chamber. In most instances, a major portion of the clove or cloves will remain within the chamber as a pulverized mass which will normally be discarded.

Another form of garlic tool will be noted in U.S. Pat. No. 6,945,486 B2, issued to Eric Y. Teng on Sep. 20, 2005. This tool, in the principally disclosed embodiment, includes a pair of interesting pressure units respectively having protruding rows of linearly aligned "grater elements" wherein the grater elements of one row alternate with the grater elements of the second row for what the inventor refers to as a peeling, pressing and grating of unpeeled garlic cloves therebetween. The rotation of the pressure units of Teng relative to each other will result in a corresponding rotation of the elements of the opposed rows about a center of rotation toward alignment wherein all of the elements of one row are in intimate alternating alignment with the elements of the other row. Such an arrangement would appear to move an engaged garlic clove radially outward from the center of rotation along the rather blunt and wide engaging faces of the elements. This in turn would tend to encourage the major crushing action to occur toward the outer circumference of the grating chamber wherein outward movement of the garlic will be limited by the peripheral wall. As such, it is likely that substantial force would be required to maintain the desired twisting action between the two hand manipulated pressure units. Should, to the contrary, the actual grating in Teng occur along the full length of the rows, the linear arrangement of both sets of elements will result in a rotational period wherein all of the elements are aligned. This simultaneous alignment of all of the elements of each set alternating with the elements of the other set with an engaged clove therebetween could also tend to produce increased resistance to rotation.

Earlier variations of similar hand-rotating comminuting tools will be noted in Winfield et al, 795,746, issued Jul. 25, 1905; and Ross et al, U.S. Pat. No. 6,637,684 B1, issued Oct. 28, 2003.

SUMMARY OF THE INVENTION

It is a principal object of the present invention to provide a food processing tool which constitutes a significant advance in an old and crowded art as noted above. In doing so, the present invention proposes a processing tool particularly adapted for the comminuting or reduction of garlic cloves to small particles. Pursuant thereto, the proposed tool is a self-contained assembly uniquely adapted to handle every aspect of the processing of garlic from the decorticating or removing of the garlic skin to the enclosed collection of the pulverized, minced or sliced particles of the comminuted garlic cloves.

The processing tool is considered additionally unique in the components thereof which perform the various operational steps in processing the garlic. These include a comminuting insert or unit which includes two sets or series of blades, each set providing a different comminuted product for selective use in accord with the desire of the user. For example, one set of blades can provide for an end product comprising multiple minute slices. The second set of blades can provide for a more complete pulverizing or mincing of the end product. The comminuting insert is invertible to upwardly direct the desired set of blades with the insert removably mounted on an underlying container which can be used to store the garlic cloves prior to processing. The container also has the additional significant function of providing a handle for the insert during manipulation of the tool.

A cap overlies the comminuting insert and includes a depending set of aligned and spaced pusher elements or teeth which interdigitate or are alternately received within the spaced defined between the individual blades of the upwardly directed set of blades. This interdigitation occurs as the cap and container-mounted insert are rotated relative to each other. This in turn effects a desired movement of the insert received garlic cloves, engaged by the pusher teeth, through the comminuting blades to produce the desired comminuting action. In order to enhance the engagement and movement of the cloves through the blades, and to both facilitate this movement and ensure a more complete utilization of the comminuting blades, the pusher teeth are aligned in a sinusoidal configuration or path presenting a concave configuration along the preferred direction of rotation for each of the radial segments of the set of teeth to the opposite side of the center of rotation. With this arrangement, the garlic has been found to assume a more uniform spread along the full length of the blades rather than being progressively shifted radially outward to the outer extremities of the blade set. This is particularly the situation wherein the concave face of each radial extent of the sinusoidal set constitutes the leading face of the rotating set of teeth. In conjunction therewith, the sinusoidal orientation of the teeth, provides for a sequential passing of the teeth through the blade set for a smoother, easier and more practical comminuting action. In regard thereto and as will be noted from selected figures of the drawings, at no time are the pusher teeth all simultaneously nested with all of the blades, thus providing an effective sequential comminuting action which facilitates rotation of the teeth and blades relative to each other. This contrasts to a situation wherein both the blades and teeth are formed with the elements linearly aligned which requires a substantial rotational period wherein all of the teeth are in cooperative comminuting engagement with all of the blades. As will be appreciated, the actual twisting of rotational movement can be in either rotational direction, or in fact can consist of a back and forth movement, depending on the preferences of the user.

The tool assemblage also includes a lift-off tray which has a set of openings corresponding to and of a size to accommodate each of the two sets of blades. Each tray fits closely about the blades of an operating set with the blades extending upwardly through the openings for engagement by the pusher teeth. The comminuting action thus occurs in the tray itself with the tray receiving the comminuted clove particles. Subsequent to the comminuting operation, the tray is merely lifted upwardly off of the blades, gathering the comminuted garlic therein for subsequent use.

The cap is provided with an upwardly opening upper chamber which is sized to receive the lower closed portion of the container upon a removal of the cap from the assembly. The chamber, preferably provided with slight ridges or projections in the lower surface thereof, is adapted to receive a clove as an initial step in the processing. The lower portion of the container is then introduced into the chamber over the clove and rotated within the chamber so as to effectively strip the skin or shell from the garlic cloves. The cloves are then ready for introduction into the comminuting insert.

From the above, it will be appreciated that the tool, in a compact and highly utilitarian assembly, conveniently provides for the-complete processing of garlic with each of the steps thereof being within a confined environment and utilizing easily effected manipulative steps.

The objects, features and advantages of the invention will become more apparent to those skilled in the art as the invention is detailed in the following description of the preferred embodiments.

BRIEF DESCRIPTION OF THE DRAWINGS

Attention is now directed to the drawings wherein like reference numerals refer to like parts throughout the several views and wherein:

FIG. 1 is a top perspective view of the food processing tool of the invention;

FIG. 2 is a top plan view of the tool;

FIG. 12 is a vertical cross-sectional view through the complete assemblage of the components in operating position;

FIG. 15 is a vertical cross-sectional view illustrating the lower portion of the container engaged within the upwardly directed cap chamber in a manner as to, upon relative rotation therebetween, decorticate or remove the skin or shell of the garlic.

DESCRIPTION OF PREFERRED EMBODIMENT

Figure 3:
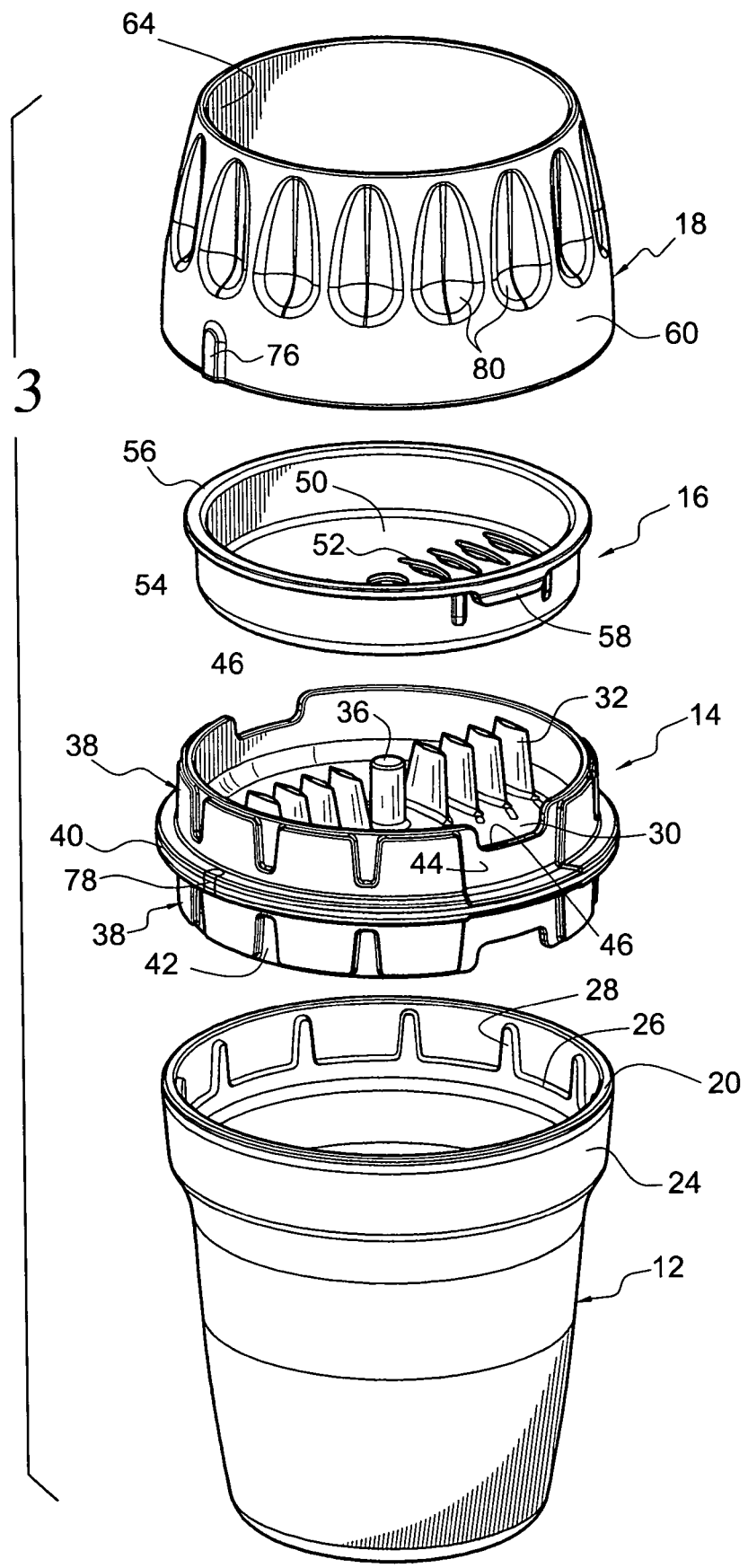
FIG. 3 is an exploded perspective view of the components of the tool.

Referring now more specifically to the drawings, the processing tool 10 of the present invention is basically an assemblage of four interrelating and cooperating components, an upwardly opening base container 12 of a height to function as an easily grasped handle, an invertible comminuting insert or unit 14, a collecting or lift-out tray 16, and an overlying cap or cover 18 of an easily grasped and manipulable configuration.

The container 12 tapers slightly downward from the open upper end or mouth 20 thereof. The lower end of the container 12 has a closed bottom or bottom panel 22 which is slightly upwardly convex as will best be noted in the cross-sectional view of FIG. 12. The upper extent of the container 12, or the wall thereof, is slightly outwardly offset as at 24 and includes, about the inner face thereof below the extreme upper end of the container, a peripheral upwardly directed shoulder 26. A plurality of equally spaced upwardly extending positioning ribs 28 are provided peripherally about the inner face of the container upper portion 24 in upwardly extending relation from the upwardly directed shoulder 26 toward the open mouth 20 of the container.

Figure 13:
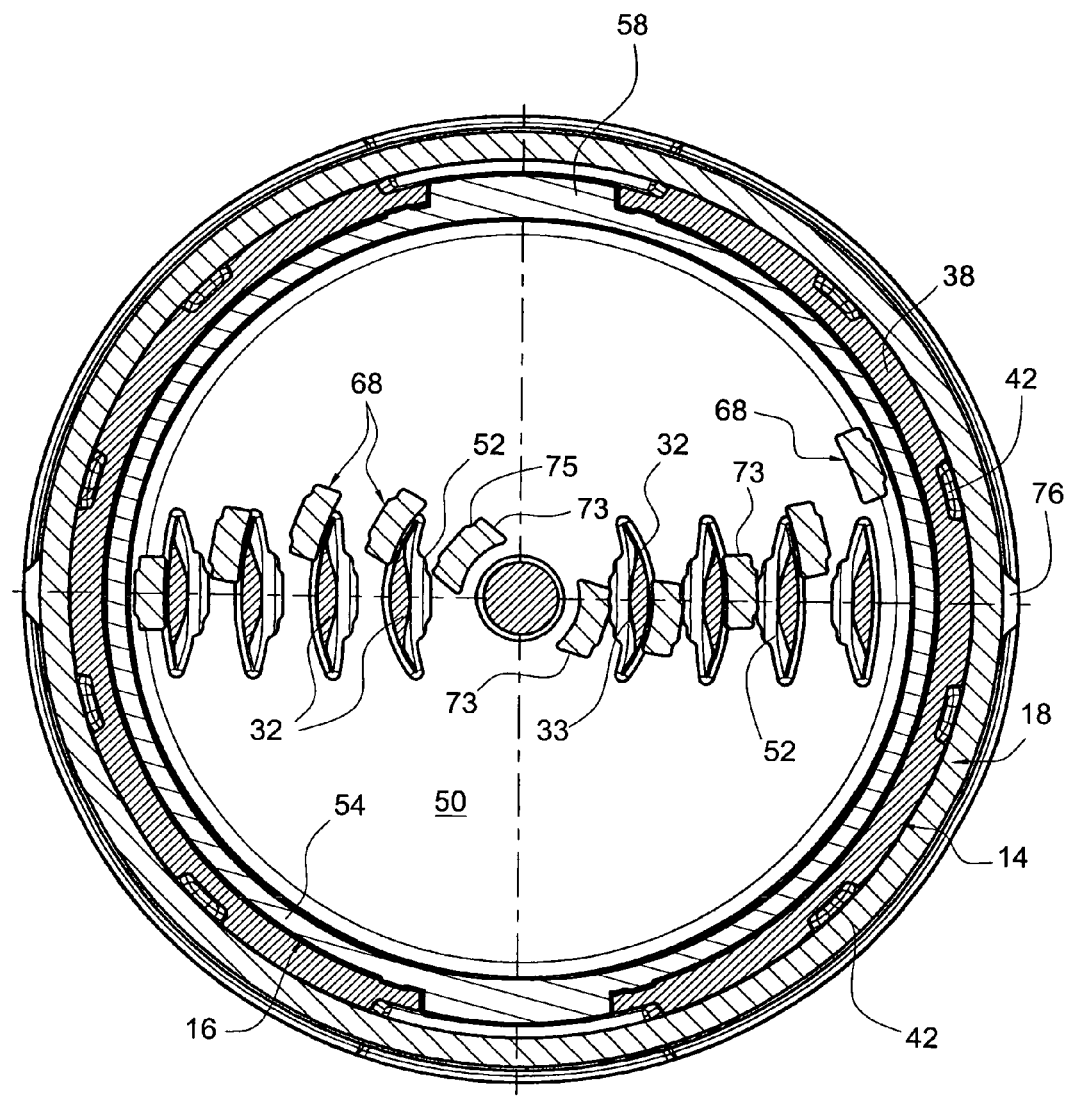
FIG. 13 is a horizontal cross-sectional view taken substantially on a plane passing along line 13-13 in FIG. 12 and illustrating the slicing blades received through the tray openings and the relationship thereof to the sinusoidal set of pusher teeth.

The comminuting insert 14 includes a central flat base or support panel 30 having opposed first and second faces which can alternately be positioned upward to define an upper face upon an inverting of the comminuting insert 14. A set or series of comminuting blades 32,34 are linearly aligned in substantially equally spaced relation to each other diametrically across both faces or surfaces of the panel 30. Each set of blades 32,34 extends radially outward from and to the opposed sides of a center of rotation defined, in each instance, by a projecting cylindrical shaft 36. The blades 32 are basically slicing blades and are transversely elongate with thin slicing extremities and a convex outer face, that is the face directed toward the outer periphery of the insert 14, such being the operational face along which the actual slicing occurs. The arcs of these outer faces become progressively greater and flatter outward from the center of rotation to correspond with the path of travel during the comminuting operation about the center of rotation. Noting FIG. 13 in particular, it will be seen that the slicing blades 32 can be centrally enlarged, as at 33, on the inner or non-slicing face of the blade so as to provide enhanced strength and stability. It will also be noted, as in FIG. 5, the blades 32 taper along the height thereof upward from the support panel 30.

Figure 4:
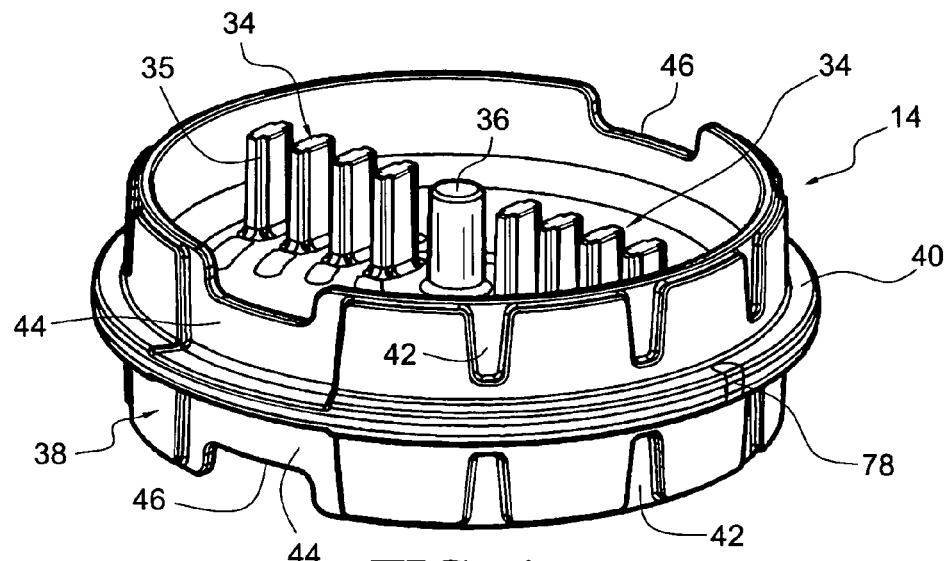
FIG. 4 is a perspective view of the comminuting insert with the set of mincing blades upwardly directed.
Figure 14:
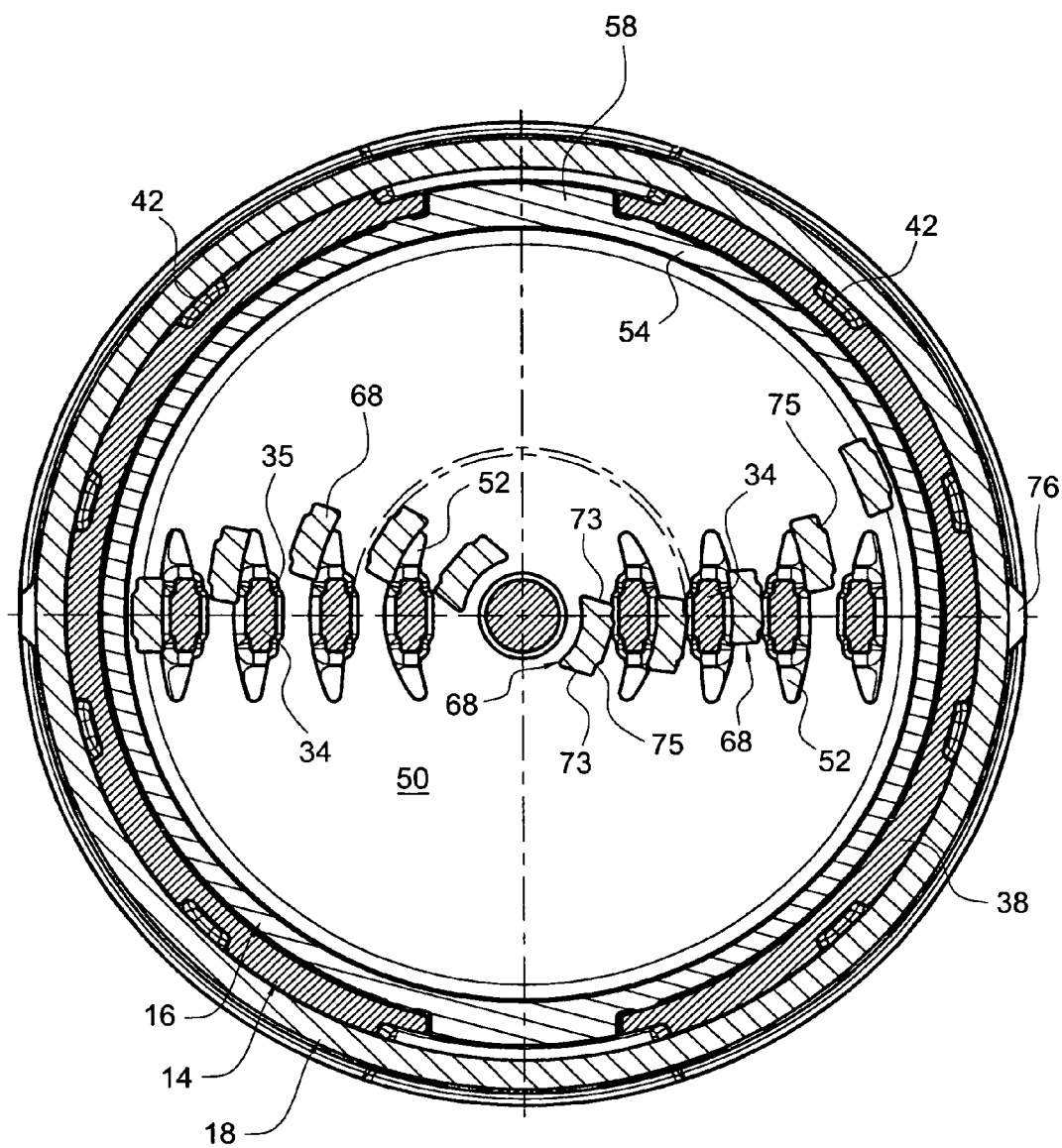
FIG. 14 is a similar cross-sectional view wherein the mincing blades are upwardly directed through the tray openings and operationally engaged by the pusher teeth.

The second set of comminuting blades 34, noting FIGS. 4 and 14 in particular, are substantially thicker than the blades 32 and present a generally rectangular cross section with relieved or notched vertical edges 35. Such blades 34 provide blunt leading faces as opposed to the slicing edges of the blades 32 and are intended to produce a mincing action forming small particles as opposed to thin slices generally resulting from use of the slicing blades 32.

The comminuting insert 14 also includes a pair of duplicate opposed peripheral walls 38, extending outward from the opposed faces of the blade support panel 30. A peripheral flange 40, substantially coplanar with the support panel 30 extends outwardly peripherally about the insert between the walls 38. Noting FIGS. 12 and 15 in particular, it would be seen that the walls 38 are at each of a height so as to engage the outer peripheral edge thereon on the container support shoulder 26 with the peripheral flange 40 simultaneously generally engaging on the upper edge 20 defining the mouth of the container 12.

Figure 5:
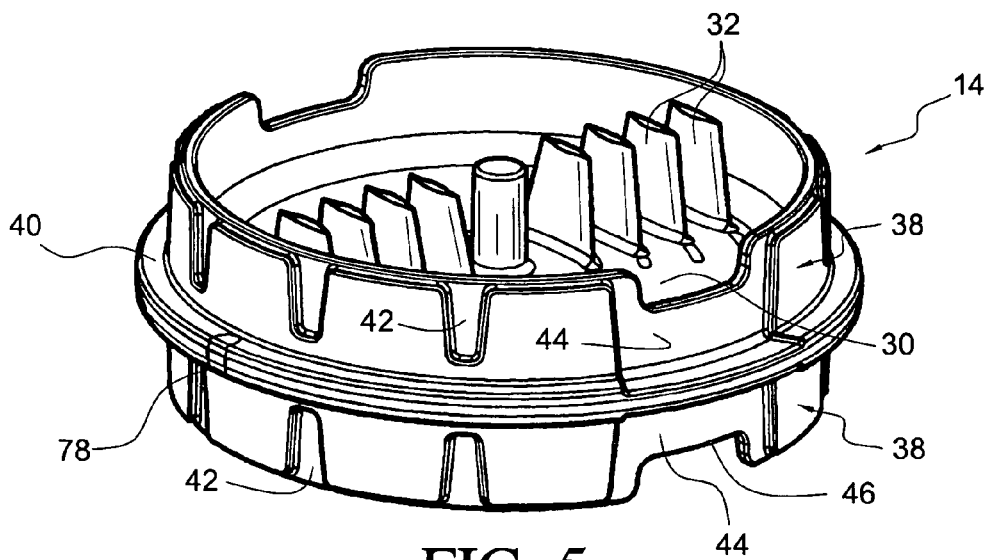
FIG. 5 is a similar perspective view with the comminuting insert inverted and with the slicing blades upwardly directed.
Figure 6:
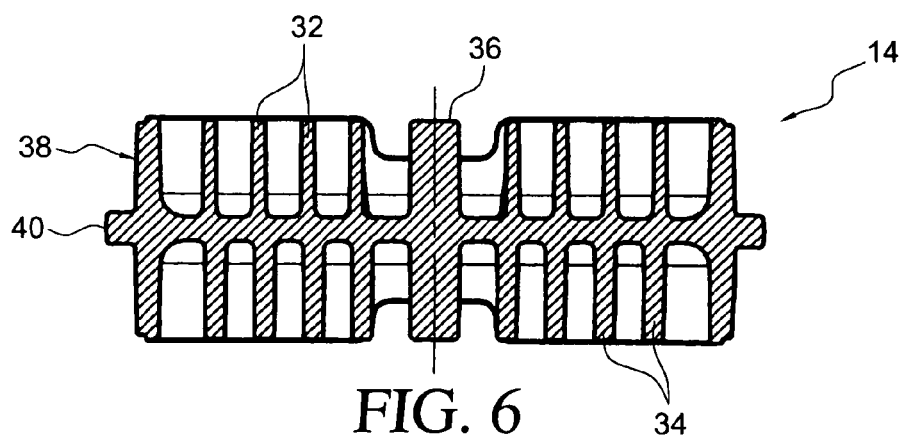
FIG. 6 is a transverse cross-sectional view through the comminuting insert with the mincing and slicing blades illustrated in section.
Figure 7:
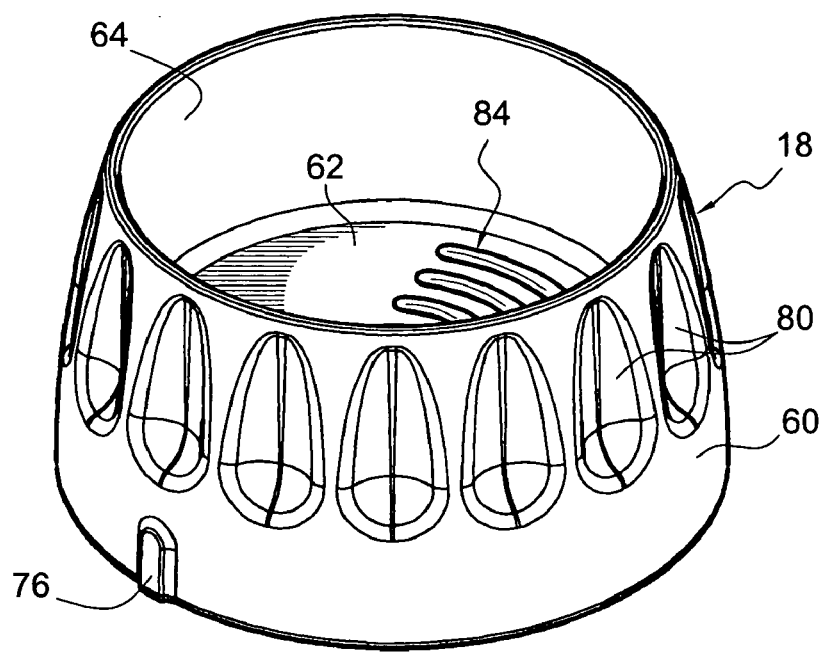
FIG. 7 is top perspective view of the cap illustrating the skin peeling chamber.
Figure 8:
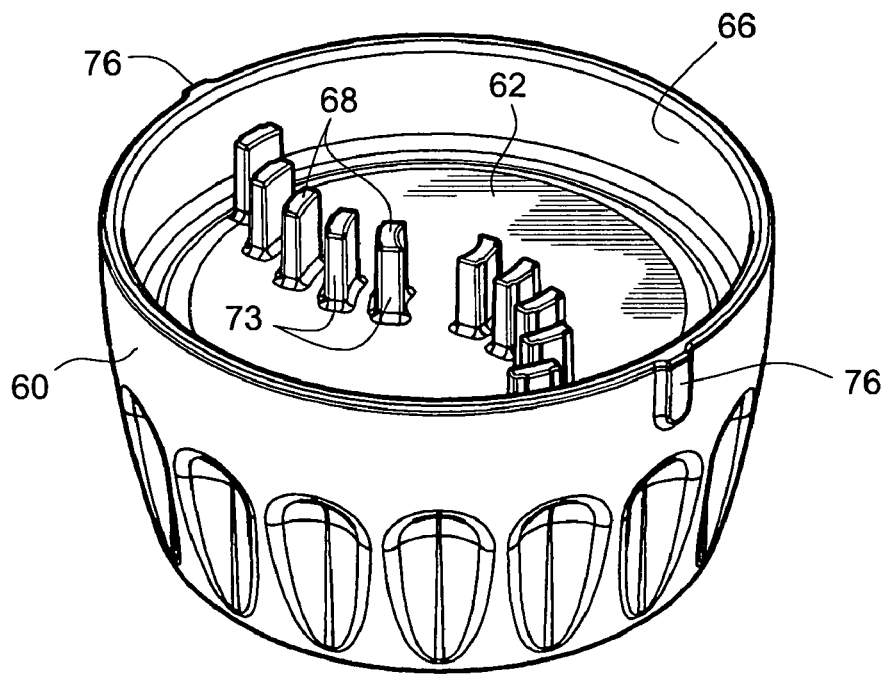
FIG. 8 is a bottom perspective view of the cap illustrating the sinusoidal set of pusher teeth.

With reference to FIGS. 3, 4 and 5, it will also be noted that each of the walls 38 includes a series of peripherally spaced recesses 42 in the outer face thereof which, upon a mounting of the comminuting insert 14 within the container mouth, receive the upwardly directed positioning ribs 28 of the container therein. This relationship stabilizes the insert 14 against rotation relative to the underlying handle-defining container 12.

Each of the insert walls 38 also includes a diametrically opposed pair of substantially wider recesses 44 with the upper edge of the corresponding wall inwardly or downwardly offset as at 46 for interlocking engagement with the collecting or lift-out tray 16 as shall be described subsequently. It is to be appreciated that each of the wider recesses 44 is of a width so as to accommodate two adjacent upwardly directed container ribs 28, thus not interfering with the seating of the insert 14 within the container 12.

The collecting tray 16 has a bottom panel 50 conforming in size and configuration to the base panel 30 of the comminuting insert 14 and is adapted to seat on the chosen upwardly directed face thereof during the actual comminuting procedure. In order to accommodate the two sets of comminuting blades 32 and 34, the tray bottom panel 50 has a linearly aligned series or set of openings 52 formed therein and positioned so as to receive either set of upwardly directed blades. In other words, the blade receiving openings 52, as will be noted in FIGS. 13 and 14 in particular, are of a transverse width as to accommodate the relatively wide narrow slicing blades 32, and are centrally enlarged so as to accommodate the narrower thicker mincing blades 34. In each case, the openings 52 are of a minimum size as to closely slide over each set of blades to reduce any tendency for the comminuted garlic falling through the openings either during the comminuting operation or as the tray is upwardly removed from the comminuting unit 14.

The tray 16 includes a peripheral upstanding wall 54 which, upon a positioning of the tray 16, is received within and slidably engaged with the inner surface of the corresponding upwardly directed wall 38 of the comminuting unit 14. The tray wall 54 is of substantially equal height with the corresponding wall 38 with the bottom panel 50 of the tray 16 seating on the blade mounting base panel 30 of the comminuting unit 14. The tray wall 54 also includes a laterally outwardly directed upper flange 56 which seats on the upper edge of the corresponding wall 38 of the comminuting unit 14 for facilitating a grasping, positioning and removal of the tray 16. The tray flange 56 is of a transverse width no greater than the width of the upper edge of the wall 38, thus not interfering with a proper mounting of the cap 18 as shall be described subsequently. Further, while the upwardly projecting set of comminuting blades 32 or 34 will function to properly orient the tray openings, the proper rotational positioning of the tray relative to the comminuting unit 14 is further provided for by diametrically opposed relative wide depending lugs 58 which are integral with the flange 56 and tray wall 54, and are closely received within the diametrically opposed offsets 46 provided within the alternately upwardly directed walls 38 of the comminuting unit 14.

The cap or cover 18 of the tool 10 includes a peripheral wall 60 with a transverse interior base panel 62 dividing the interior of the cap into a deep upper chamber 64 opening upwardly through the cap and a relatively shallower lower chamber 66 opening downwardly. The lower or bottom chamber 66 is of a depth so as to telescopically receive the upper portion of the comminuting unit 14, noting FIG. 12 in particular, with the lower edge of the cap wall 60 seating on the peripheral flange 40 for relative rotation between the unit 14 and the cap 18.

The undersurface of the cap base panel 62 includes a series or set of aligned pusher teeth 68 rigid therewith and depending therefrom in spaced relation to each other. The teeth 68, as opposed to the linear aligned blades 32,34, are specifically in an S-shaped or sinusoidal pattern which extends generally diametrically across the panel 62. The teeth are spaced and so positioned as to interdigitate or rotationally align in the spaces between the comminuting unit blades upon a closing of the cap over the comminuting unit 16, again noting FIG. 12. In order to accommodate the relative rotational movement of the teeth 68 of the cap, particularly in light of the minimal spacing desired between the alternating teeth and blades, the inner faces of the teeth 68, that is those faces inwardly directed toward the center of rotation, are arcuate with the angle of the arc of the teeth progressively increasing radially outward from the innermost tooth immediately adjacent the center of rotation to the outermost tooth. Thus, the arc inner face of each tooth generally corresponds or is parallel to the arc of an adjacent cooperating blade 32 and will also closely conform to the blunter blades 34 when the teeth and blades align. Note in particular the cross-sectional detail of FIG. 14.

Figure 9:
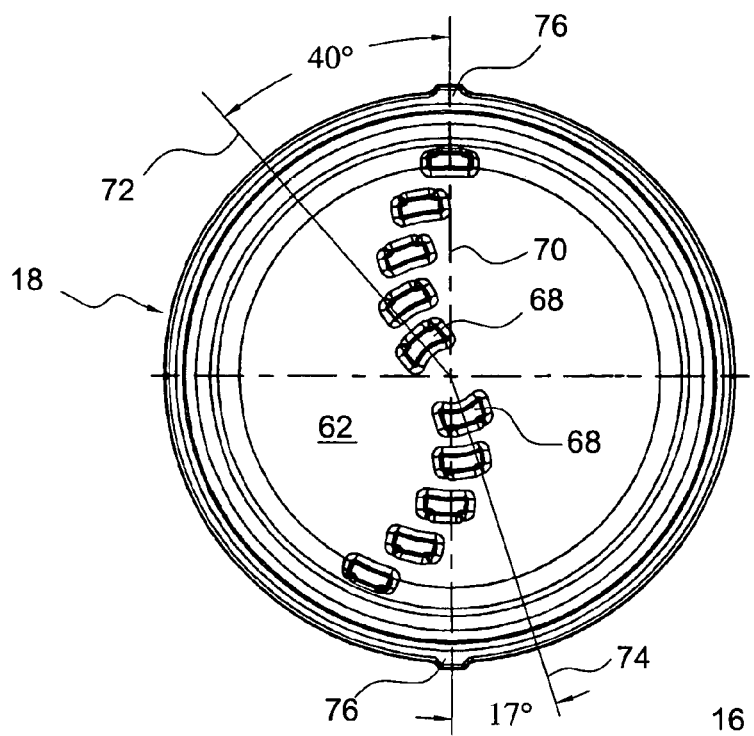
FIG. 9 is a top plan view of the inverted cap as shown in FIG. 8.
Figure 10:
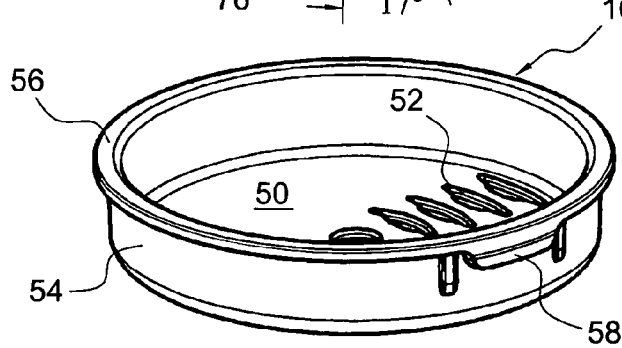
FIG. 10 is a top perspective view of the lift-out tray.
Figure 11:
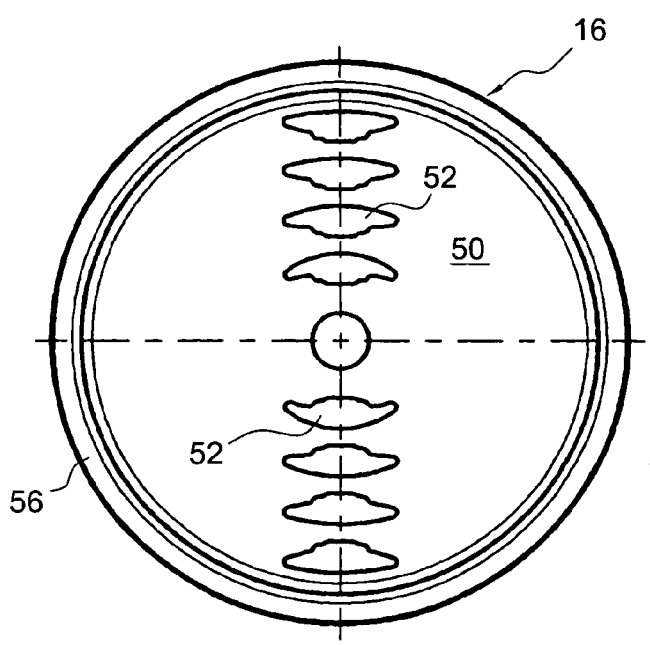
FIG. 11 is a top plan view of the lift-out tray.

Noting FIG. 9 in particular, it will be seen that the alignment of the pusher teeth 68 of the cap, while substantially sinusoidal, extend generally along a diametric centerline 70. However, the opposed radial extents of the aligned teeth, while presenting a concave leading face for both segments when rotated clockwise as viewed in FIG. 9, are slightly differently offset from the centerline 70. More particularly, and noting the upper segment of aligned teeth 68 in FIG. 9, the innermost tooth thereof is, as designated by dimension line 72, centered at a 40 degree angle from the diametric center line 70. Similarly, the innermost tooth 68 of the lower segment of aligned teeth 68 as viewed in FIG. 9, is centered at an angle of 17.5 degree as indicated by dimension line 74. Oriented in this manner, and as best seen in FIG. 14, there is a sequential engagement of the teeth and blades outward from the center of rotation which varies from one radial segment to the other with the full set of teeth 68 at no time being fully engaged with the full set of blades 32,34. The pusher teeth 68 themselves have rather blunt opposed ends 73 to provide for positive pushing faces to engage the cloves and move the cloves past the blades. The blunt ends of each tooth have notched outer vertical corners as at 75, which are the corners facing the cooperating blade immediately outward thereof for an enhanced gripping and stabilizing of a clove as it is introduced to the blades. These notched corners 75 particularly cooperate with the notched corners 35 on the blunt blades 34 in effecting a positive engagement of the clove therebetween.

In mounting the cap 18 on the comminuting unit 14 it is desired that, in order to accommodate introduced cloves, the teeth be generally aligned along the upwardly directed set of blades to define compartments to each side thereof for reception of the cloves. Accordingly, an appropriate alignment means, for example a pair of diametrically opposed lugs 76 aligned generally with the diametric centerline of the teeth 68, is provided for alignment with alignment means 78 on the comminuting unit. The alignment means 78 aligns with the sets of blades 32 or 34, and can, as an example, be indicia 78 at diametrically opposed points on the outer edge of the comminuting unit flange 40.

In order to facilitate rotation of the cap 18 relative to the comminuting unit 14, the wall 60 of the cap is provided with finger accommodating recesses 80 vertically extending thereon and spaced about the periphery of the cap wall 60.

The upwardly opening upper chamber 64 of the cap 16 is specifically configured to rotatably receive the lower portion of the container 12, note in particular FIG. 15, for rotation therein in the initial step of peeling the skin or shell from garlic cloves prior to the actual comminuting steps. In order to enhance the rubbing action on the cloves within the upper chamber 64 as the container lower portion is rotated therein, and to thus facilitate the skin removal, the base panel 62 may be provided with slightly raised arcuate gripping ribs or ridges 84.

As a further guide to aligning the teeth with the blades, the ridges 84, as noted in FIG. 2 in particular, can have the center line thereof in alignment with the alignment lugs 76. Thus, by noting the ridges, readily visible on the cap, the user can easily see the position of the teeth relative to the blades.

In using the tool of the invention, the garlic cloves are skinned or shelled within the upper chamber 64 of the cap 18 by the simple expedient of confining the cloves within the chamber 64 and subjecting the cloves to a rubbing or abrading action by rotation of the lower portion of the container 12 therein. The skin, separated from the clove in this manner, is easily retrieved and discarded.

The comminuting unit 14 is then positioned within the upper end of the container 12 with the desired blade set 32, 34 upwardly directed. The lift-off or collecting tray 16 is positioned within the unit 14 with the blades engaged through the tray openings 52 and exposed thereabove. The skinned cloves are then put into the comminuting unit 14 to each side of the set of operating blades.

In order to effect the comminuting operation, the cap 18, with the depending teeth 68, is then rotatably positioned over the comminuting unit 14 with the teeth and blades in substantial alignment and accommodated between the unit-received cloves positioned to each side of the blades. As noted above, alignment of the teeth and blades is facilitated by the cooperating alignment means 76 and 78. The mincing, slicing, pulverizing or otherwise comminuting of the cloves is then effected by a rotation of the cap 18 relative to the comminuting unit 14 by a grasping of the cap in one hand and the container 12 in the other and twisting the components relative to each other. While not limited to, it is preferred that the concave side of each segment of the radial extents of the teeth constitute the leading face and define the preferred direction of rotation of the blades relative to the teeth. In this manner, there is a tendency to confine the cloves, during the actual pulverizing thereof, along the full extent of the teeth. This, in conjunction with the sinusoidal configuration of the set of teeth operating in conjunction with the linear set of blades, and the avoidance of the simultaneous engagement of all of the teeth with all of the blades, facilitates the relative rotation between the components, enhances the pulverizing action, and reduces the actual force required to achieve the pulverization.

Once the pulverization is complete, the teeth and blades are preferably again aligned to collect the comminuted material in piles to each side thereof for easy removal. The cap 18 is then removed and the collection tray 16 lifted upwardly so as to remove the pulverized material from the set of blades and out of the recessed blade compartment. The collected pulverized material can then be used or stored as desired. The dual function of the container 12, both as a convenient handle means for the assembly during the comminuting operation, and as a storage means for the garlic cloves before the comminuting operations is particularly desirable in providing the self-container, multi-functional tool desired.

The foregoing is illustrative of the principles of the invention, and while a specific embodiment of the invention has been set forth in detail, it is to be appreciated that variations may occur to those skilled in the art without departing from the spirit and scope of the invention as set forth in the following claims.

The invention claimed is:

1. A processing tool for comestibles comprising a comminuting unit having opposed upper and lower faces, a cap received over said comminuting unit for relative rotation therebetween about a central axis of rotation, a set of comminuting blades fixed to and extending upward from said upper face of said comminuting unit, said blades being linearly aligned transversely on said upper face and radially outward from said central axis, said blades being spaced from each other to define spaces therebetween, a series of spaced pusher teeth fixed to and depending from said cap, said teeth aligning along an arc extending transversely on said cap and generally radially outward from said central axis, said teeth sequentially aligning with said blades within said spaces upon rotation of said cap relative to said comminuting unit for comminuting engagement of a comestible with said blades, wherein said blades are aligned diametrically across said upper face, said alignment extending through and radially beyond opposed sides of said central axis, wherein said teeth are aligned in an S-shaped pattern extending across said cap and substantially centered on said central axis, said aligned teeth defining an arc to each of diametrically opposed sides of said central axis, wherein said defined arcs are in the same rotational direction about said central axis, and wherein said comminuting unit has a second set of comminuting blades fixed to and extending from said lower face, said second set of blades being linearly aligned and substantially parallel to said first mentioned set of blades, said blades of said first and second sets presenting different comminuting profiles, said comminuting unit being invertible for selective upward orientation of said second set of blades, said cap being rotatably engageable over the inverted comminuting unit with said pusher teeth on said cap aligning with the blades of said second set of blades for comminuting cooperation therewith upon rotation of said cap relative to said comminuting unit.

2. The tool of claim 1 including a collection tray having a tray bottom substantially coextensive with said upper and lower faces of said comminuting unit, a linearly aligned series of openings defined through said tray bottom and sized to receive each set of blades, said tray bottom seating on the upwardly directed face of said comminuting unit with the corresponding set of blades projecting upwardly through the openings, said tray being upwardly removable from said comminuting unit upon removal of said cap subsequent to comminution of a received combustible.

3. The tool of claim 2 including a container with a closed lower end portion and an open upper mouth, said comminuting unit being removably received within said container mouth and positioned with a set of said blades upwardly directed, and means fixing said unit in said mouth against rotation relative to said container.

4. The tool of claim 3 wherein said cap has a base panel mounting said pusher teeth, said panel being substantially coextensive with said unit and overlying said unit with said teeth depending from said panel into rotational alignment with said spaces between said blades, and a peripheral wall surrounding said cap base panel and extending upward therefrom to define an upwardly opening chamber in said cap, said lower portion of said container being adapted for selective reception and rotation within said cap chamber for cooperation with said chamber in decorticating a comestible received in said chamber upon relative rotation between said chamber and said lower portion of said container received therein.

5. The tool of claim 4 including gripping means on said cap base panel and upwardly directed into said chamber for an engagement of an introduced comestible to reduce rotational movement of the combustible as the chamber and container lower portion are rotated relative to each other.

6. The tool of claim 1 including a collection tray having a tray bottom substantially coextensive with said upper and lower faces of said comminuting unit, a linearly aligned series of openings defined through said tray bottom and sized to receive said set of blades, said tray bottom seating on the upwardly directed face of said comminuting unit with the set of blades projecting upwardly through the openings, said tray being upwardly removable from said comminuting unit upon removal of said cap subsequent to comminution of a received combustible.

7. A processing tool for comestibles comprising a comminuting unit having a support panel with opposed upper and lower faces, a first set of comminuting blades fixed to and extending upwardly from said upper face, said blades being spaced from each other and aligned transversely across said upper face, a second set of aligned and spaced blades fixed to and extending from said lower face transversely thereacross and both opposed to and paralleling said first set of blades, each set of blades having a comminuting profile differing from that of the other set of blades, said comminuting unit being invertible and selectively upwardly directing either face and set of blades thereon, a cap rotatably receivable over said comminuting unit and a corresponding upwardly directed set of blades thereon, said cap including a series of spaced aligned pusher teeth depending therefrom and selectively engaging between the blades of the upwardly directed set of blades on said comminuting unit upon rotation of said cap relative to said comminuting unit about a common center of rotation for a comminuting of comestibles received between said cap and said comminuting unit.

8. The tool of claim 7 wherein said depending aligned teeth on said cap define a curving configuration presenting an arced segment to each radial side of said center of rotation.

9. The tool of claim 8 including a collection tray having a tray bottom substantially coextensive with said upper and lower faces of said comminuting unit, an aligned series of openings defined through said tray bottom and sized to alternately receive each set of blades, said tray bottom seating on the upwardly directed face of said comminuting unit with the corresponding set of blades projecting upwardly through the openings, said tray being upwardly removable said comminuting unit upon removal of said cap subsequent to comminution of received combustibles.

10. The tool of claim 9 wherein the blades in each set of blades are linearly aligned.

11. A comminuting tool for edibles comprising a comminuting unit having a support panel with a set of spaced linearly aligned comminuting blades mounted thereon and extending transversely thereacross, a collection tray having a tray bottom substantially coextensive with said support panel and having a linearly aligned series of spaced openings defined through said bottom, said openings being sized to receive said set of blades therethrough for exposure of the blades thereabove, a cap rotatably received over said comminuting unit and enclosing said tray and upwardly directed blades, said cap being rotatable relative to said comminuting unit, and pusher means on said cap engageable with and adapted to cooperatively move an edible through said comminuting unit blades upon relative rotation between said cap and said comminuting unit, said tray, subsequent to a comminuting of an edible, being upwardly removable from said set of blades for a collection and removal of a comminuted edible.

12. The tool of claim 11 wherein said comminuting unit is invertible and has opposed first and second faces, said first mentioned set of blades extending from said first face, said comminuting unit having a second set of comminuting blades fixed to and extending from said lower face, said second set of blades being linearly aligned and substantially parallel to said first mentioned set of blades, said blades of said first and second sets presenting different comminuting profiles, said comminuting unit being invertible for selective upward orientation of said second set of blades, said cap rotatably engaging over the inverted comminuting unit with said pusher means on said cap aligning with the blades of said second set of blades for comminuting cooperation therewith upon rotation of said cap relative to said comminuting unit.

13. The tool of claim 12 wherein said pusher means for engaging and moving edibles through said set of blades, comprises an aligned set of spaced teeth which, upon rotation of the cap relative to the comminuting unit, engage between the spaced blades, progressively moving into and out of alignment therebetween, said teeth being aligned in an arcuate non-linear configuration.

14. The tool of claim 11 wherein said comminuting unit includes a vertical wall peripherally surrounding said set of blades, and means for facilitating alignment of said tray within said unit wall for registration of said set of blades through said tray holes and for precluding relative rotation between said tray and said unit.

15. The tool of claim 14 including an upstanding wall on said tray surrounding said set of blades for a retention of the edibles brought in during the comminuting process and a peripheral gripping flange on an extending outward from said tray wall and engageable on said comminuting unit wall.

16. The tool of claim 15 wherein said cap includes a depending wall portion encircling and enclosing said tray and unit wall about said blades.

17. The tool of claim 12 wherein said tray openings are sized so as to receive, alternately, either set of comminuting blades upon an inverting adjustment of said comminuting unit.

18. The tool of claim 17 including a container with a closed lower portion and an open upwardly directed mouth, said comminuting unit being received within said container mouth, and means fixing said comminuting unit against rotation relative to said container, said container defining handle means for said comminuting unit for facilitating relative rotation between said cap and said comminuting unit.

19. The processing tool of claim 18 including an upwardly opening chamber defined within said cap and sized to telescopically and rotatably receive the lower portion of said container for a confining and manipulation of an edible therebetween.

20. The tool of claim 13 wherein said teeth each include opposed ends adapted to engage against a unit-received edible during rotation, each said tooth end having a corner portion with a gripping notch defined therein to at least partially grip and stabilize an edible against a cooperating blade as the edible is comminuted.

* * * * *